(12) United States Patent
Stephens

(10) Patent No.: US 8,504,041 B2
(45) Date of Patent: Aug. 6, 2013

(54) NETWORK ELEMENTS PROVIDING COMMUNICATIONS WITH POOLED SWITCHING CENTERS AND RELATED METHODS

(75) Inventor: Gary Stephens, Richardson, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 41 days.

(21) Appl. No.: 13/155,796

(22) Filed: Jun. 8, 2011

(65) Prior Publication Data

US 2012/0315906 A1    Dec. 13, 2012

(51) Int. Cl.
*H04B 7/00* (2006.01)
*H04W 4/00* (2009.01)

(52) U.S. Cl.
USPC ............................ 455/436; 370/331; 455/507

(58) Field of Classification Search
USPC .............. 455/456.1, 436, 433, 424, 560, 507, 455/423; 370/352
See application file for complete search history.

(56) References Cited

U.S. PATENT DOCUMENTS

| | | | |
|---|---|---|---|
| 6,009,328 A * | 12/1999 | Muszynski | 455/442 |
| 6,408,182 B1 * | 6/2002 | Davidson et al. | 455/433 |
| 8,351,962 B2 * | 1/2013 | Tian et al. | 455/458 |
| 2005/0070283 A1 * | 3/2005 | Hashimoto et al. | 455/435.1 |
| 2005/0074015 A1 * | 4/2005 | Chari et al. | 370/400 |
| 2005/0078660 A1 * | 4/2005 | Wood | 370/352 |
| 2006/0245404 A1 * | 11/2006 | Bajic | 370/338 |

* cited by examiner

*Primary Examiner* — Nizar Sivji

(57) ABSTRACT

A network element may provide communications with a wireless communications network including a plurality of pooled mobile switching centers coupled to a base station controller so that each of the plurality of pooled mobile switching centers is configured to control communications with respective wireless terminals communicating through the base station controller. Operations of the network element may include transmitting a ping message from the network element to a primary pooled mobile switching center of the plurality of pooled mobile switching centers. Responsive to receipt of a ping response message at the network element from the primary pooled mobile switching center, a communication may be transmitted from the network element to the primary pooled mobile switching center. Responsive to non-receipt of a ping response message at the network element from the primary pooled mobile switching center, the communication may be transmitted from the network element to a secondary pooled mobile switching center of the plurality of pooled mobile switching centers.

15 Claims, 9 Drawing Sheets

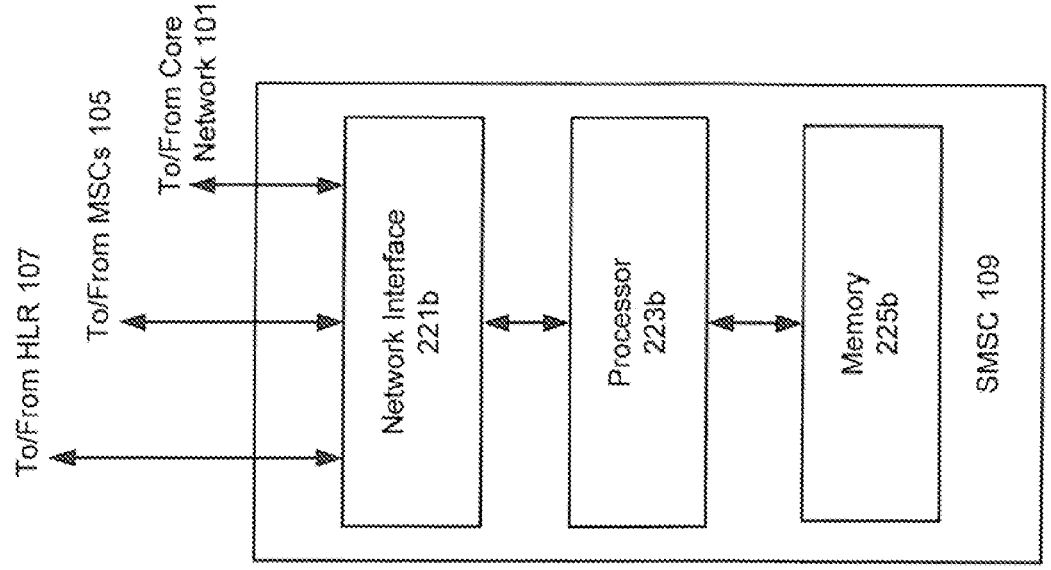
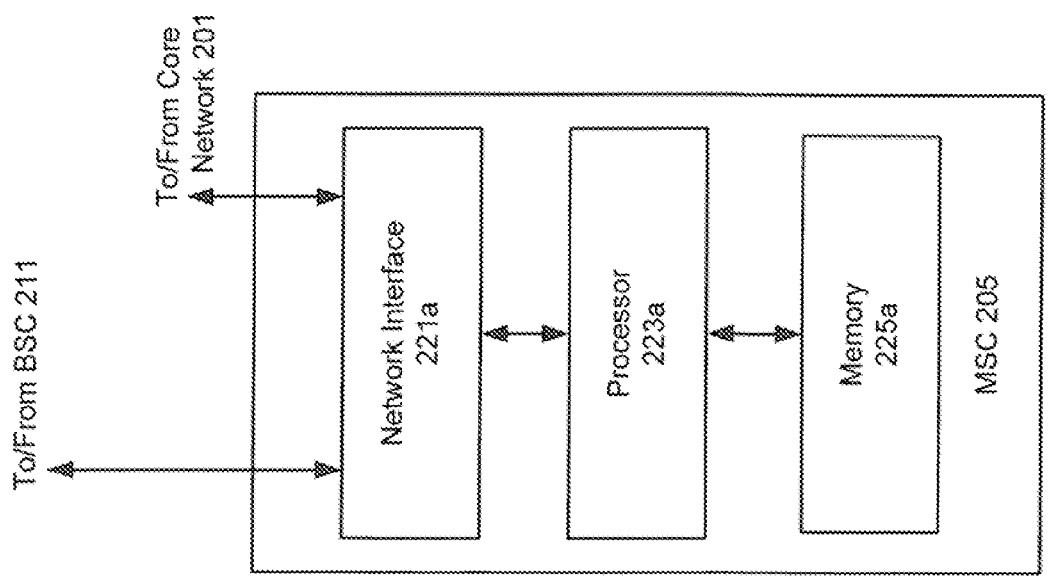

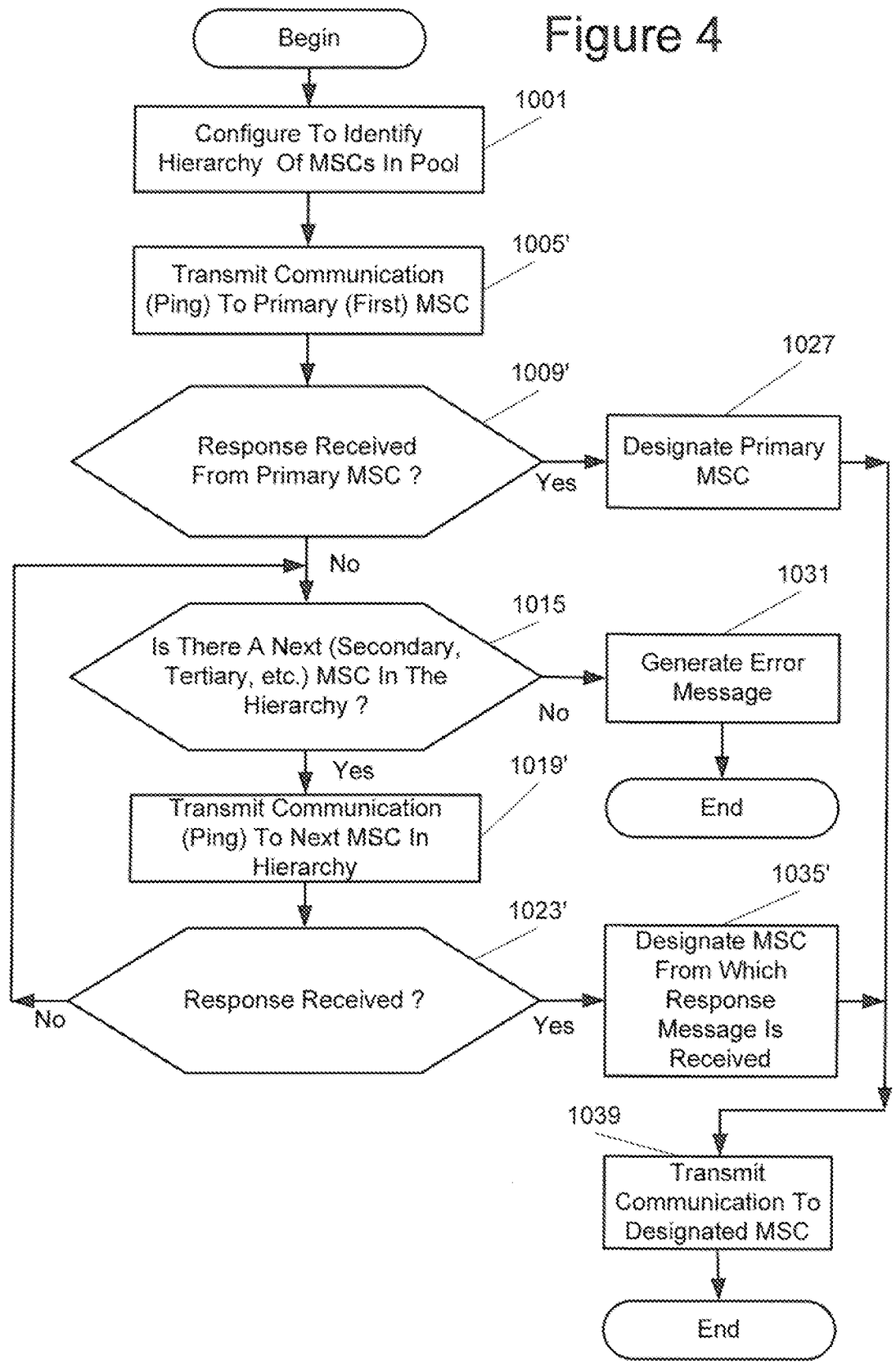

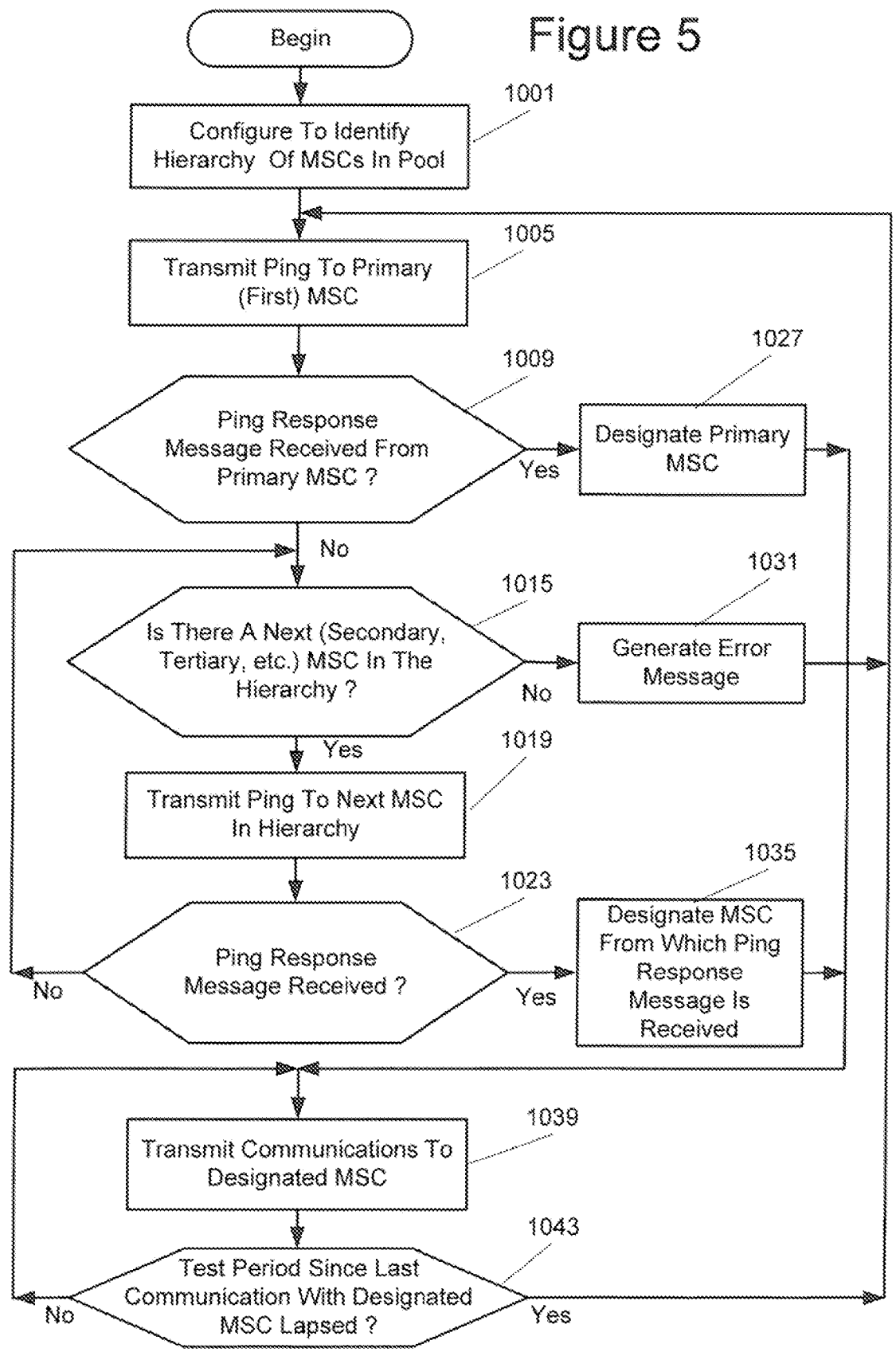

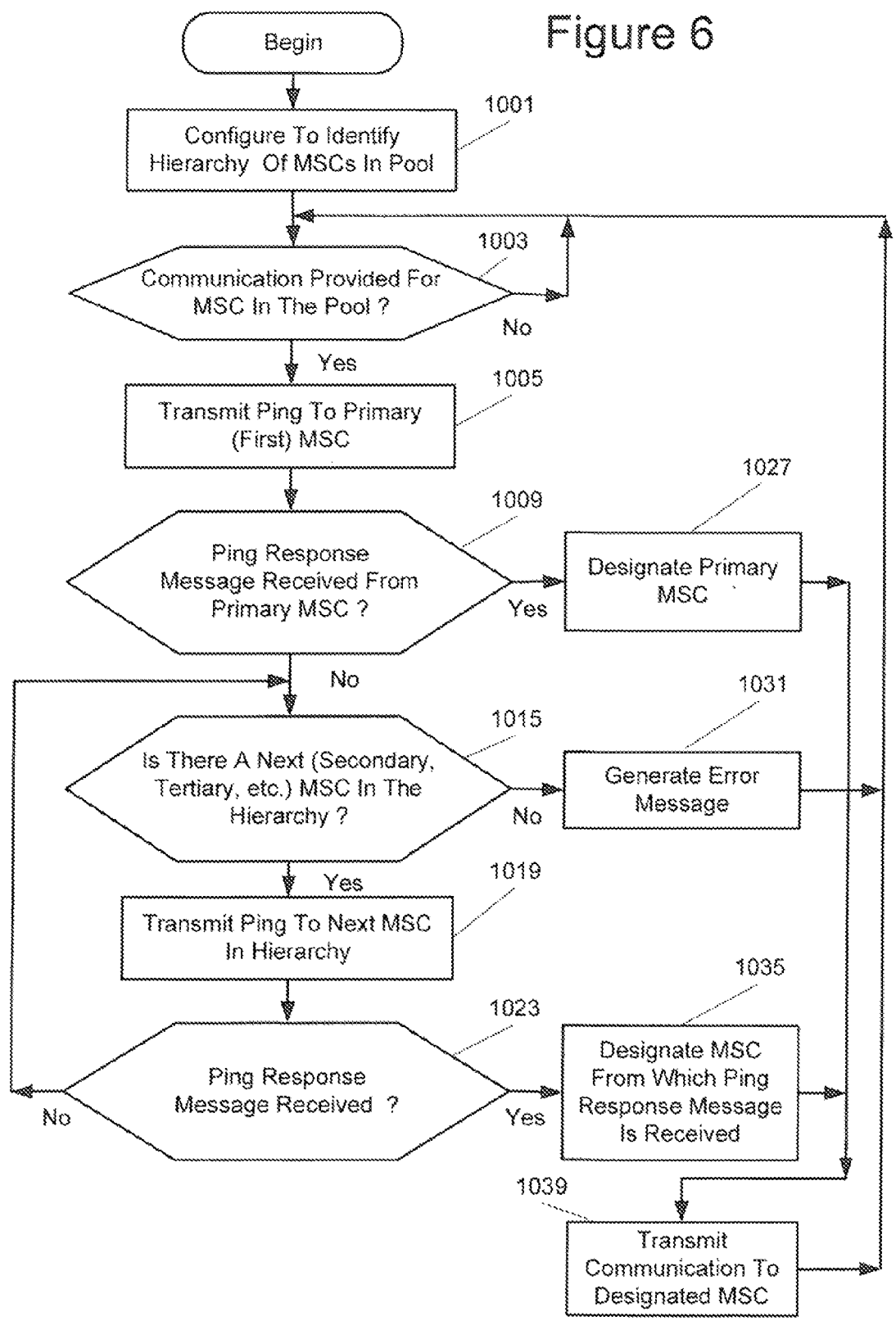

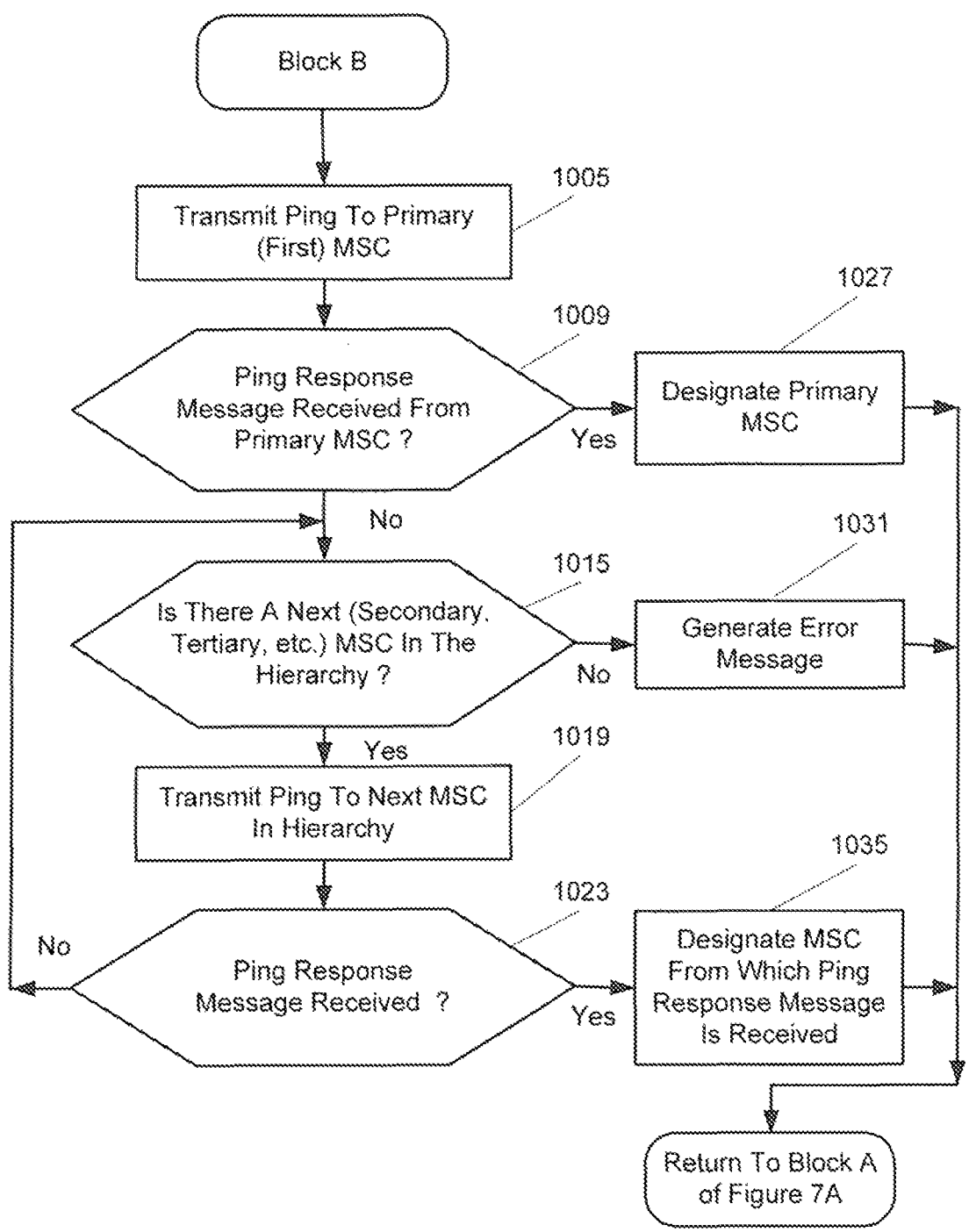

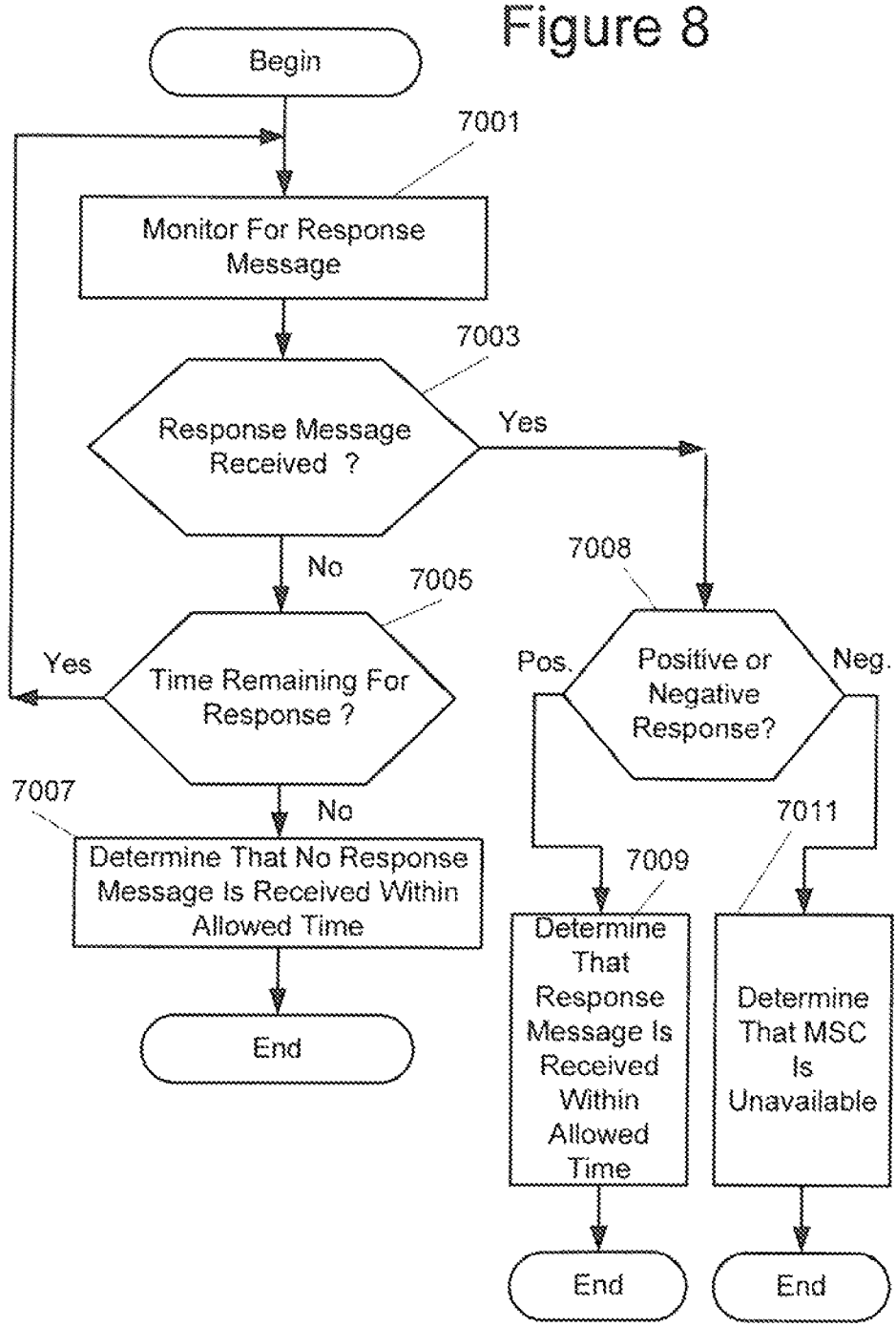

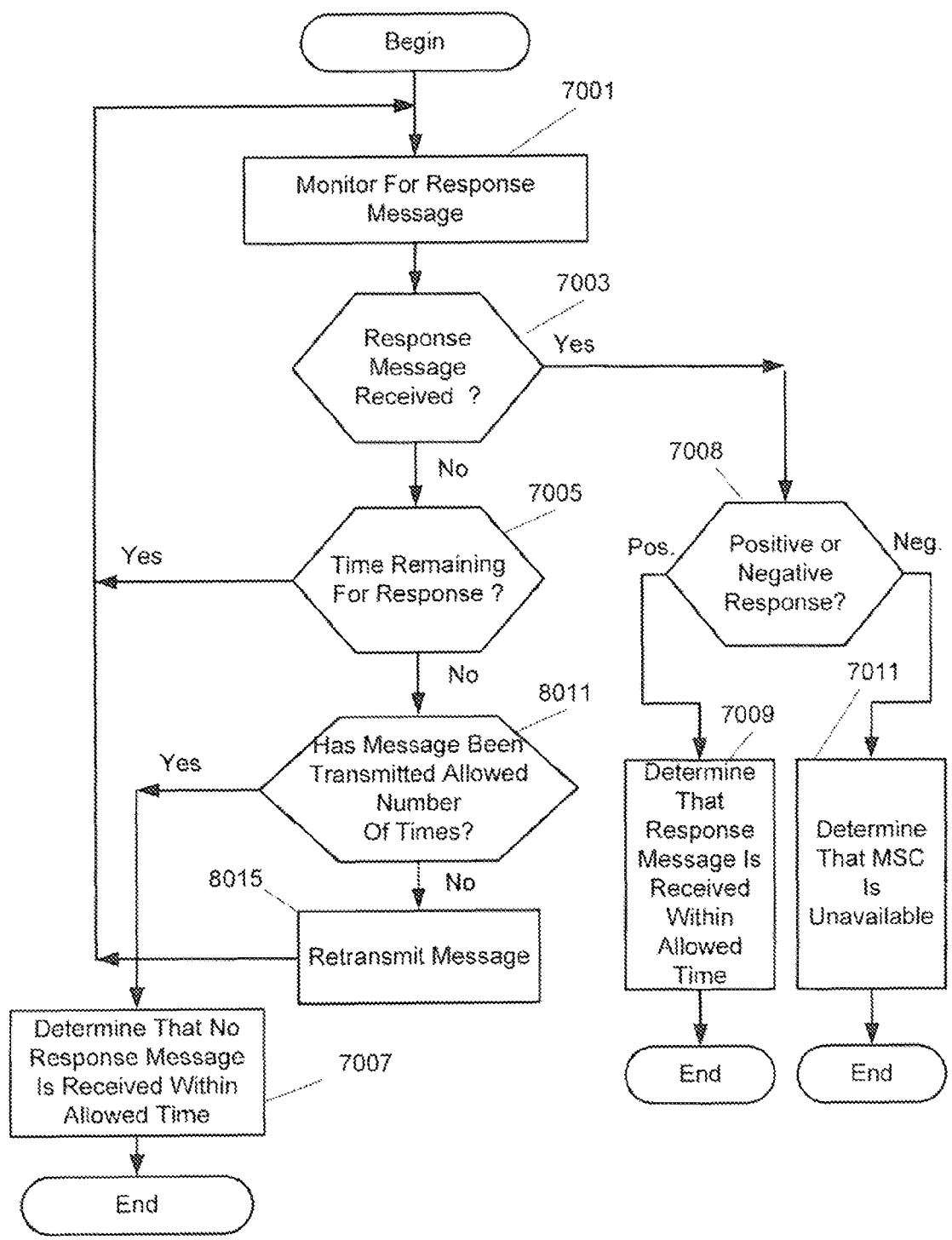

NETWORK ELEMENTS PROVIDING COMMUNICATIONS WITH POOLED SWITCHING CENTERS AND RELATED METHODS

TECHNICAL FIELD

The present disclosure is directed to communications and, more particularly, to radio access networks and related network elements and methods.

BACKGROUND

In a typical cellular radio system, wireless terminals (also referred to as wireless mobile terminals, user terminals, user equipment nodes or UEs, mobile stations, etc.) communicate via a radio access network (RAN) with one or more core networks. The RAN covers a geographical area which is divided into cell areas, with each cell area being served by a RAN node, also referred to as a radio base station (BS). A cell area is a geographical area where radio coverage is provided by the base station at a base station site. The base stations communicate through radio communication channels with wireless terminals within the coverage area of the base stations. The type of radio communication channels utilized between the base station and the wireless terminals define the radio access technology (RAT). There are radio access technologies that support circuit-switched and packet-switched operations, for example CDMA (code division multiple access) or GSM (Global System for Mobile Communications), and there are radio access technologies that support high-rate, spectrally efficient data operations, for example High Rate Packet Data (HRPD), Long Term Evolution (LTE), and/or Third Generation Partnership Project (3GPP/3GPP2).

In CDMA networks according to ANSI standards (including the ANSI-41 standard), for example, a base station controller (BSC) or controllers (BSCs) may control a plurality of base stations over a coverage area of the network, and communications may be switched through a pool of mobile switching/service centers (MSCs) between the BSC(s) and a core network (CN) and/or a public switched telephone network (PSTN). A pool of MSCs in such a network may provide redundancy in the event that one or more MSCs are unavailable for use. For example, a pool of separately located MSCs may continue network operations (possibly at reduced network capacity) even if one or more of the MSCs of the pool is unavailable due to power outage, malfunction, maintenance, destruction, etc.

Accordingly, multiple MSCs of a pool may simultaneously serve wireless terminals in a wide geographic region using a common BSC or using a common set of BSCs. Such MSC pooling may thus provide increased capacity available to cover wireless terminals in a particular geographic area and also provide a mechanism by which coverage may continue when one or more of the MSCs is out-of-service or otherwise unavailable.

While existing standards may define operations of MSCs within a pool, communications from network elements outside the pool may fail due to loss of service and/or unavailability of an MSC with which such outside network elements attempt to communicate. Accordingly, there continues to exist a need in the art for methods of operating network elements to route communications to/through pooled MSCs.

SUMMARY

According to some embodiments, a network element may provide communications with a wireless communications network including a plurality of pooled mobile switching centers coupled to a base station controller so that each of the plurality of pooled mobile switching centers is configured to control communications with respective wireless terminals communicating through the base station controller. Operations of the network element may include transmitting a ping message from the network element to a primary pooled mobile switching center of the plurality of pooled mobile switching centers. Responsive to receipt of a ping response message at the network element from the primary pooled mobile switching center, a communication may be transmitted from the network element to the primary pooled mobile switching center. Responsive to non-receipt of a ping response message at the network element from the primary pooled mobile switching center, the communication may be transmitted from the network element to a secondary pooled mobile switching center of the plurality of pooled mobile switching centers.

By designating a hierarchy/order of MSCs of a pool with which a network element communicates, a probability that the network element reaches an MSC of the pool may be increased for communications (e.g., broadcast SMSs, BCP requests, IHHO requests, etc.) that are not addressed for a particular wireless terminal. A secondary MSC of the pool (also referred to as a backup MSC of the pool), for example, may be selected for a communication(s) in the event that a primary MSC of the pool does not respond. In the event that the primary MSC is non-reachable (as indicated by non-receipt of a response to a ping message), for example, a pending communication may be transmitted to the secondary MSC.

According to some other embodiments, a network element may provide communications with a wireless communications network including a plurality of pooled mobile switching centers coupled to a base station controller so that each of the plurality of pooled mobile switching centers is configured to control communications with respective wireless terminals communicating through the base station controller. Operations of the network element may include transmitting a message from the network element to a primary pooled mobile switching center of the plurality of pooled mobile switching centers. Responsive to receipt of a response message at the network element from the primary pooled mobile switching center, the primary pooled mobile switching center may be designated for transmissions from the network element to the plurality of pooled mobile switching centers. After transmitting the message to the primary pooled mobile switching center and responsive to non-receipt of a response message at the network element from the primary pooled mobile switching center, a secondary pooled mobile switching center may be designated for transmissions from the network element to the plurality of pooled mobile switching centers.

According to still other embodiments, a network element may provide communications with a wireless communications network including a plurality of pooled mobile switching centers coupled to a base station controller so that each of the plurality of pooled mobile switching centers is configured to control communications with respective wireless terminals communicating through the base station controller. The network element may include an interface configured to transmit communications to and to receive communications from the plurality of pooled mobile switching centers and a processor coupled to the interface. The processor may be configured to generate a ping message for transmission from the interface to a primary pooled mobile switching center of the plurality of pooled mobile switching centers, and to provide a communication for transmission from the interface to the primary pooled mobile switching center responsive to receipt of a ping response message at the interface from the primary pooled mobile switching center. The processor may be further configured to provide the communication for transmission from the interface to a secondary pooled mobile switching center of the plurality of pooled mobile switching centers responsive to non-receipt of a ping response message at the interface from the primary pooled mobile switching center.

According to yet other embodiments, a network element may provide communications through a wireless communications network including a plurality of pooled mobile switching centers coupled to a base station controller so that each of the plurality of pooled mobile switching centers is configured to control communications with respective wireless terminals communicating through the base station controller. The network element may include an interface configured to transmit communications to and receive communications from the plurality of pooled mobile switching centers, and a processor coupled to the interface. The processor may be configured to generate a message for transmission from the interface to a primary pooled mobile switching center of the plurality of pooled mobile switching centers, and to designate the primary pooled mobile switching center for transmissions from the network element to the plurality of pooled mobile switching centers responsive to receipt of a response message through the interface from the primary pooled mobile switching center. The processor may be further configured to designate a secondary pooled mobile switching center for transmissions from the interface to the plurality of pooled mobile switching centers after transmitting the message to the primary pooled mobile switching center and responsive to non-receipt of a response message at the network element from the primary pooled mobile switching center.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIGS. 2 and 3 are block diagrams respectively illustrating mobile switching centers (MSCs) and short message service centers (SMSCs) according to some embodiments; and FIGS. 4, 5, 6, 7A, 7B, 8, and 9 are flow charts illustrating operations of mobiles switching centers and/or short message service centers according to some embodiments.

DETAILED DESCRIPTION

Embodiments of the present invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in one or more other embodiments.

For purposes of illustration and explanation only, these and other embodiments of the present invention are described herein in the context of operating in a RAN that communicates over radio communication channels with wireless terminals (also referred to as wireless mobile terminals, user terminals, user equipment nodes or UEs, mobile stations, etc.). It will be understood, however, that the present invention is not limited to such embodiments and may be embodied generally in any type of communication network. As used herein, a wireless terminal can include any device that receives data from and/or transmits data to a communication network, and may include, but is not limited to, a mobile radiotelephone ("cellular" telephone), laptop/portable computer, pocket computer, hand-held computer, and/or desktop computer.

Figure 1:
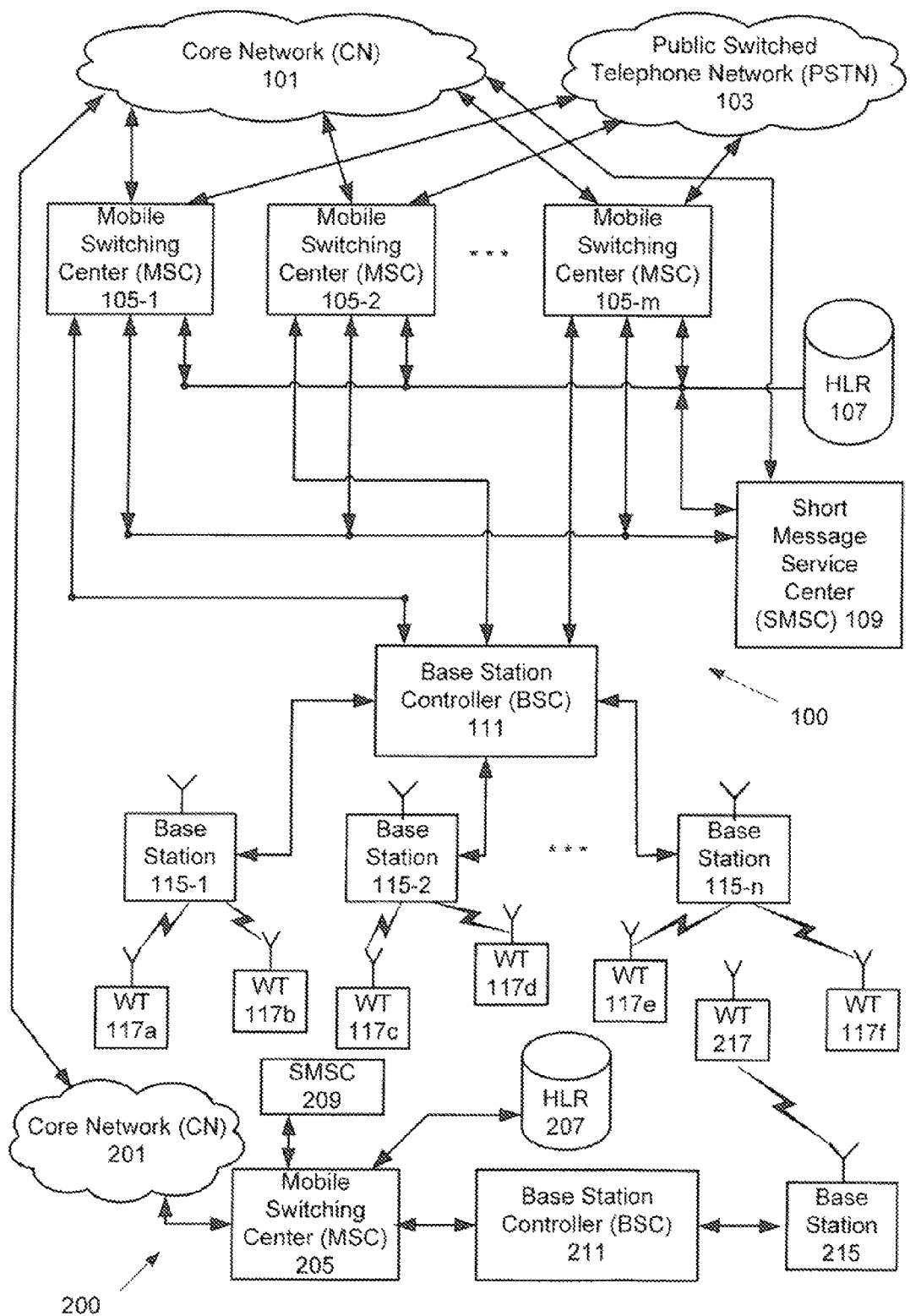
FIG. 1 is a block diagram of communication systems configured with pooled switching centers according to some embodiments.

In some embodiments shown in FIG. 1, a first Radio Access Network (RAN) 100 may include a plurality of base stations (BSs) 115-1 to 115-n connected (e.g., by landlines, radio channels, etc.) to a base station controller (BSC) 111, and a pool of mobile switching/service centers (105-1 to 105-m) may provide communications switching between BSC 111 and core network (CN) 101 and/or between BSC 111 and public switched telephone network (PSTN) 103. Base station controller (BSC) 111 supervises and coordinates various activities of the plurality of base stations 115-1 to 115-n connected thereto. While not shown in FIG. 1, RAN 100 may include one or more additional base station controllers (BSCs) coupled to the pool of MSCs 105-1 to 105-m, and each such base station controller (BSC) may supervise and coordinate activities of respective different pluralities of base stations (BSs).

Base stations (BSs) 115-1 to 115-f, base station controller (BSC) 111, and mobile switching/service centers (MSCs) 105-1 to 105-m may thus provide communications for wireless terminals (WTs) 117a to 117f operating within RAN 100. By providing the plurality of MSCs 105-1 to 105-m as a pool, the multiple MSCs of the pool may simultaneously serve wireless terminals in a wide geographic region using a common BSC or using a common set of BSCs. Such MSC pooling may thus provide increased capacity available to cover wireless terminals in a particular geographic area and also provide a mechanism by which coverage may continue when one or more of the MSCs is out-of-service or otherwise unavailable. RAN 100, for example, may be a CDMA radio access network, and coordination/communication between MSCs 105-1 to 105-m within the pool of MSCs may be provided as set forth in ANSI standards (including the ANSI-41 standard).

Stated in other words, a pool of MSCs (e.g., MSCs 105-1 to 105-n) may provide service in the aggregate for wireless terminals in a particular geographic area(s) (e.g., in an area or areas serviced by base stations 115-1 to 115-n). For example, a non-pooled MSC may always support service for all wireless terminals in coverage areas serviced by base stations associated with the non-pooled MSC, and loss of service of the non-pooled MSC may result in loss of communications for all wireless terminals in coverage areas serviced by base stations associated with the non-pooled MSC. With a pool of MSCs according to some embodiments discussed herein, capacity may be increased, and any MSC in the pool of MSCs may support service for any wireless terminal in a coverage area serviced by any base station associated with the pool of MSCs. Accordingly, the MSC of the pool supporting service for a particular wireless terminal may vary according to circumstances. The pool of MSCs may thus provide redundancy in the event that one or more of the MSCs of the pool are unavailable for service. While the loss of one MSC of a pool, for example, may result in a decrease in capacity that may be handled by base stations 115-1 to 115-n associated with the pool of MSCs, communications handled by base stations 115-1 to 115-n may continue using the remaining MSCs of the pool.

Home location register (HLR) 107 may be used to store information regarding wireless terminals 117a to 117f that subscribe to RAN 100, and more particularly, to keep current information regarding locations of wireless terminals 117a to 117f that subscribe to RAN 100 and MSCs of the pool (and/or MSCs outside the pool) providing service for the wireless terminals. Accordingly, MSCs 105-1 to 105-m can use information from HLR 107 to route communications to/from wireless terminals 117a to 117f as the wireless terminals move between coverage areas for different base stations. When a page for an incoming call for a particular wireless terminal is generated at RAN 100, information from HLR 107 may be used to route the page through an assigned MSC to the base station serving the wireless terminal.

In addition, short message service center (SMSC) 109 may be coupled to MSCs 105-1 to 105-m, to HLR 107, and/or to core network 101, and SMSC 109 may provide messaging services for wireless terminals 117a to 117f. SMSC 109, for example, may process SMS messages transmitted to/from individual ones of wireless terminals 117a to 117f. SMSC 109 may also process broadcast messages that are sent to all wireless terminals served by one or more of base stations 115-1 to 115-n. Because broadcast SMS messages are not addressed to a particular wireless terminal(s), SMSC 109 may not be able to use HLR 107 to determine a current MSC to/through which to route a broadcast message to a particular base station or base station(s). SMSC 109, for example, may include network interface 221b, processor 223b, and memory 225b as shown in FIG. 3.

In addition, a second RAN 200 may include base stations, base station controllers, mobile switching centers, and a core network(s) providing communications services for wireless terminals as discussed above with respect to RAN 100. RANs 100 and 200, for example, may be operated by different service providers, and a coverage area for RAN 200 may overlap and/or may be provided adjacent to coverage area for RAN 100. While a single base station 215, a single base station controller 211, a single mobile switching center 205, and a single core network 201 of RAN 200 are shown for purposes of illustration, RAN 200 may include any number of such network elements. Moreover, RAN 200 may also include elements such as HLR 207 and/or an SMSC 209. RAN 200 may thus include elements and provide operations similar to those discussed with respect to RAN 100. MSC 205, for example, may include network interface 221a, processor 223a, and memory 225a as shown in FIG. 2. The MSC structure of FIG. 2 may also be applied to MSCs 105-1 to 105-n of the MSC pool of RAN 100.

In embodiments of FIG. 1, base station 115-n of RAN 100 and base station 215 of RAN 200 may provide service over adjacent and/or overlapping coverage areas or cells. Base station 215, for example, may provide communications services for wireless terminal 217 while wireless terminal 217 is in the coverage area (or cell) of base station 215, and RANs 100 and 200 may be configured to hand-off service for wireless terminal 217 from base station 215 of RAN 200 to base station 115-n of RAN 100 responsive to wireless terminal 217 moving from the coverage area of base station 215 to that of base station 115-n. Similarly, base station 115-n may provide communications services for wireless terminals 117e and/or 117f while wireless terminals 117e and/or 117f are in the coverage area or cell for base station 115-n, but RANs 100 and 200 may be configured to hand-off service for wireless terminals 117e and/or 117f from base station 115-n of RAN 100 to base station 215 of RAN 200 responsive to wireless terminals 117e and/or 117f moving from the coverage area of base station 115-n to that of base station 215. Accordingly, RANs 100 and 200 may be configured to accommodate Border Cell Paging (BCP) and Intersystem Hard Handoff (IHHO) to accommodate wireless terminal movement between coverage areas of different RANs.

Border Cell Paging (BCP) may be used to determine a wireless terminal location for service by paging the wireless terminal during a termination attempt when the wireless terminal has left one MSC service area but not yet registered in a new MSC service area. Border Cell Paging (BCP), for example, may be particularly critical when a wireless terminal (e.g., wireless terminals 217) is "parked" on a border between two different MSC coverage areas (e.g., between coverage areas of base stations 115-n and 215) such that the wireless terminal frequently bounces back and forth between base stations for different RANs (e.g., between base stations 115-n and 215 of RANs 100 and 200). Wireless terminal 217, for example, may be registered with HLR 207 for service with base station 215 of RAN 200 supported by MSC 205, but base station 215 and/or MSC 205 may lose contact with wireless terminal 217. Once contact between base station 215 and wireless terminal 217 is lost, MSC 205 may generate a Border Cell Page (BCP) request, and the BCP request may be transmitted through core networks 201 and 101 to one of MSCs 105-1 to 105-n of the MSC pool of RAN 100. The MSC receiving the BCP request may then initiate a BCP page transmitted from base station 115-n to wireless terminal 217, and if wireless terminal 217 responds to the BCP page, the MSC of RAN 100 may respond through core networks 101 and 201 to MSC 205, thereby allowing MSC 205 to update records at HLR 207 for wireless terminal 217 based on the new location for wireless terminal 217. Wireless terminal 217 may thus be registered to receive service through base station 115-n of RAN 100. Because wireless terminal 217 is not registered for service with RAN 100 (much less base station 115-n) at the time of the BCP request, MSC 205 is unable to use information from HLR 107 and/or HLR 207 to determine an MSC 105-1 to 105-n (of the MSC pool of RAN 100) to/through which the BCP request should be routed.

An Intersystem Hard Handoff (IHHO) may be used to transfer radio frequency (RF) responsibility and extend the voice transport for a voice radiotelephone call from an MSC of one RAN to an MSC of another RAN while maintaining the voice radiotelephone call during and after the transfer. Wireless terminal 217, for example, may be engaged in a voice radiotelephone call supported through base station 215, BSC 211, and MSC 205, and during the voice radiotelephone call, wireless terminal 217 may move from a coverage area serviced by base station 215 of RAN 200 to a coverage area of base station 115-n of RAN 100. To provide continued support of the voice radiotelephone call, MSC 205 may initiate the handoff by transmitting an IHHO request to one of the MSCs 105-1 to 105-m of the MSC pool of RAN 100. The MSC of RAN 100 that receives the IHHO request can then initiate transfer of RF responsibility and voice transport for the call with wireless terminal 217 to base station 115-n of RAN. Because wireless terminal 217 is not registered for service with RAN 100 (much less base station 115-n) at the time of the IHHO request, MSC 205 is unable to use information from HLR 107 and/or HLR 207 to determine an MSC 105-1 to 105-n (of the MSC pool of RAN 100) to/through which the IHHO request should be routed.

With a pool of MSCs (e.g., including MSCs 105-1 to 105-n) according to ANSI standards (including the ANSI-41 standard), for example, communications between MSCs of the pool may be defined according to the standard. Communications between MSCs of the pool and network elements outside of the pool (e.g., SMSC 109, MSC 205 of another RAN, etc.), however, may not be so clearly defined according to the ANSI standards. With communications provided by network elements outside the pool that are directed to a particular wireless terminal, the network element outside the pool may use HLR records to identify the MSC of the pool to/through which the communication should be transmitted. If the MSC identified by the HLR records is non-reachable or out of service, however, the communication may fail. Moreover, with communications that are not directed to a particular wireless terminal (e.g., broadcast SMS messages) and/or with communications to establish service in a RAN (e.g., IHHO requests, BCP requests, etc.), HLR records cannot be used to identify an MSC of the pool to/through which communications should be transmitted.

For communications such as cellular radiotelephone calls and SMS messages that are addressed to a particular wireless terminal, elements (e.g., MSCs and/or SMSCs) of RANs 100 and 200 may be configured to retrieve information from HLRs (e.g., HLRs 107 and/or 207) to route communications to the appropriate wireless terminals. As noted above, information for each wireless terminal (e.g., servicing base station, servicing base station controller, servicing MSC of a pool of MSCs, etc.) may be stored in a respective HLR. With a pool of MSCs (e.g., MSCs 105-1 to 105-n) servicing wireless terminals 117a to 117f, network elements (e.g., SMSC 109, SMSC 209, MSC 205, etc.) can use information from HLR 107 to determine to/through which MSC of the pool the communication should be routed.

For communications (e.g., SMS broadcast messages, IHHO requests, BCP requests, etc.) where a network element (e.g., SMSC 109, SMSC 209, MSC 205, etc.) outside a pool of MSCs cannot use HLR records to identify a particular MSC (e.g., 105-1 to 105-m) of the pool, the network element (e.g., MSC 205, SMSC 109, SMSC 209, etc.) may maintain a hierarchy/order of the MSCs of the pool in memory 225 (e.g., memory 225a or 225b) to define an order of the MSCs of the pool to be used to attempt such communications. More particularly, the hierarchy may be used to identify primary (or first), secondary (or second), tertiary (or third), etc. MSCs of the pool, and the network element may attempt communications with the MSCs in the order defined by the hierarchy/order. Moreover, the order of MSCs in the hierarchy may be revised based on communications (e.g., pings) between the network element and MSCs of the pool. As discussed in greater detail below, the network element may transmit a communication (e.g., a ping message) to the primary MSC of the pool (as identified by the hierarchy), and if a response to the communication (e.g., a response to the ping message) is received from the primary MSC within a time allowed, the network element may maintain the status of the primary MSC in the hierarchy and transmit communications thereto. If a response to the communication (e.g., a response to the ping message) is not received within a time allowed, the network element may attempt communications with a secondary/second MSC (as identified by the hierarchy) and/or the secondary MSC may be redesignated as the primary MSC of the hierarchy.

As used herein, the terms primary/first, secondary/second, tertiary/third, etc. may refer to a hierarchy/order of MSCs within a pool of MSCs that a network element uses when transmitting communications to/through the pool. While a secondary/second MSC may refer to a particular MSC in the order (following the primary/first MSC and preceding the tertiary/third MSC), a secondary/second MSC may more generally refer to any MSC included in the hierarchy/order after the primary/first MSC. Stated in other words, a secondary/second MSC may refer to any backup MSC in the hierarchy/order following the primary/first MSC.

As shown in the flow chart of FIG. 4, a processor 223 (e.g., processor 223a of MSC 205 and/or processor 223b of SMSC 109) may be configured to identify a hierarchy/order of MSCs 105-1 to 105-n in the pool at block 1001, and the hierarchy/order of MSCs may be saved in memory 225 (e.g., memory 225a of MSC 205 or memory 225b of SMSC 109). At block 1005', processor 223 may transmit a communication/message (e.g., a ping) through network interface 221 (e.g., network interface 221a of MSC 205 or network interface 221b of SMSC 109) to the primary (or first) MSC of the MSCs 105-1 to 105-n (as designated by the hierarchy in memory 225).

At block 1009', processor 223 may determine whether a response to the communication/message (e.g., the ping message) is received from the primary MSC through network interface 221. If a response (e.g., a ping response message) to the communication/message is received at block 1009', processor 223 may designate the primary MSC for a subsequent communication at block 1027, and processor 223 may transmit a subsequent communication (e.g., an SMS broadcast, an IHHO request, a BCP request, etc.) to the designated primary MSC at block 1039.

According to some embodiments, the communication/message of block 1005' (and subsequent block 1019') may be a non-substantive ping that is used to test for the presence of the targeted MSC to which the ping is sent. If the ping is sent by a network element and received by the targeted MSC, the targeted MSC transmits a response to the ping (e.g., an acknowledgment or ACK) to the originating network element, and receipt of the response at the originating network element indicates availability of the MSC to which the ping was sent. Non-receipt of a response to the ping may indicate that the MSC is non-reachable (e.g., that the MSC is out of service or otherwise unable to communicate) so that a ping should be sent to a next MSC in the hierarchy/order. Such a ping may essentially be a request for the targeted MSC to confirm (via a response such as an acknowledgement or ACK) that it is alive.

According to some other embodiments, the communication/message of block 1005' (and subsequent block 1019') may be a substantive communication (e.g., a broadcast SMS, an BCP request, an IHHO request, etc.). If the substantive communication is received at the targeted MSC, the targeted MSC may process the substantive communication and respond to the originating network element with a response (e.g., an acknowledgement or ACK) indicating both availability of the targeted MSC and processing of the communication (so that separate ping and substantive communications are not required). Non-receipt of a response to the communication may indicate that the MSC is non-reachable (e.g., that the MSC is out of service or otherwise unable to communicate) so that the communication should be resent to a next MSC in the hierarchy/order.

If a response (e.g., a ping response) to the communication/message is not received at block 1009' (e.g., if the primary MSC is non-reachable or otherwise out of service), processor 223 may determine if there is a next (e.g., a secondary or second) MSC in the hierarchy of MSCs 105-1 to 105-n in the pool at block 1015. If there is a next (e.g., secondary or second) MSC in the hierarchy at block 1015, processor 223 may be configured at block 1019' to transmit the communication/message (e.g., a second ping message) through network interface 221 to the secondary MSC of MSCs 105-1 to 105-n (as designated by the hierarchy in memory 225).

At block 1023', processor 223 may determine whether a response to the communication/message (e.g., the ping message) is received from the MSC through network interface 221. If a response (e.g., a ping response) to the communication/message is not received at block 1023', operations of blocks 1015, 1019', and 1023' may be repeated until either a response message is received from an MSC in the hierarchy at block 1023' or messages are sent to all MSCs identified in the hierarchy without response from any. If no responses are received from any of the MSCs of the hierarchy at block 1015, processor 223 may generate an error message at block 1031.

If a response is received at block 1023' from a MSC in the hierarchy (other than the primary/first MSC), processor 223 may designate the MSC from which the response is received at block 1035' for a subsequent communication, and processor 223 may transmit a communication through network interface 221 to the designated MSC at block 1039. At block 1035', processor 223 may designate the non-primary MSC from which the response was received by reordering the hierarchy of MSCs of the pool saved in memory 225. For example, the primary MSC and any non-primary MSCs that did not respond may be removed from the ordering of the hierarchy or moved to the end of the order, and the new hierarchy/order may be saved to memory 225.

At blocks 1009' and 1023', processor 223 may determine if a response message is received as discussed below with respect FIGS. 8 and 9. According to some embodiments shown in FIG. 8, processor 223 may monitor for receipt of a response message through network interface 221 at block 7001. If a response message is received by processor 223 within a period of time allowed (e.g., a predetermined period of time after transmitting the communication/message or ping message) at block 7003, processor 223 may determine at block 7008 whether the response is positive (e.g., an acknowledgement or ACK) or negative (e.g., a negative acknowledgement or NACK). If the response is positive, processor 223 may determine at block 7009 that the response message was received within the allowed time and proceed to designate the positively responding MSC. If the response is negative, processor 223 may determine at block 7011 that the MSC is unavailable and proceed as if a no response is received during the allowed time (i.e., proceed with a next MSC in the hierarchy or generate an error message if all MSCs of the hierarchy have been queried). An MSC may be unavailable, for example, if usage of the MSC exceeds a threshold capacity. According to some embodiments a negative response or NACK·may not be supported in which case, blocks 7008 and 7011 may be omitted with the "Yes" output of block 7003 being routed directly to block 7009.

As long as there is time remaining for the response message at block 7005, processor 223 may continue monitoring for the response message at block 7001. Once the allowed period of time has passed (i.e., there is no more time remaining) without having received the response message at block 7005, processor 223 may determine at block 7007 that no response message has been received. Processor 223, for example, may determine that no response message has been received at block 7007, and this determination may be maintained even if the response is received after expiration of the allowed time at block 7005. Operations of FIG. 8 may thus allow a determination that the MSC is non-responsive with reasonable certainty within a reasonable period of time. Increasing the time allowed may increase certainty that the MSC is truly non-responsive (e.g., to accommodate delays due to traffic), while reducing the time allowed may reduce latency/delay in the system.

According to embodiments shown in FIG. 9, processor 223 may perform operations 7001, 7003, 7005, 7008, 7009, and 7011 as discussed above with respect to FIG. 8, with additional operations allowing multiple transmissions/retransmissions of the original communication/message (e.g., the ping message) of block 1005' and/or 1019'. After transmitting a communication at block 1005' or block 1019', processor 223 may perform operations of blocks 1015 and/or 1023' by monitoring for response message at block 7001, determining if the response message is received at block 7003, and determining if time is remaining for response at block 7005, as discussed above with respect to FIG. 8. If the time allowed passes at block 7005 without receiving the response, processor 223 may determine at block 8011 if the message has been transmitted the allowed number of times at block 8011. If the communication has not been transmitted the allowed number of times, processor may retransmit the communication at block 8015, and then repeat operations of blocks 7001, 7003, 7005, and 8011. If the communication has been transmitted the allowed number of times at block 8011 without receiving a response at block 7003, processor 223 may determine at block 7007 that no message is received within the allowed time.

Operations of FIG. 9 differ from those of FIG. 8 in that FIG. 9 allows the communication/message to be transmitted a predetermined number of times without response (providing an allowed time for response after each transmission of the communication/message). As discussed above with respect to FIG. 8, increasing the time allowed for response to a communication/message at block 7005 may increase certainty that the MSC is truly non-responsive (e.g., to accommodate delays due to traffic), while reducing the time allowed at block 7005 may reduce latency/delay in the system. Similarly, increasing a number of allowed transmissions/retransmissions of the communication/message at block 8011 may increase certainty that the MSC is truly non-responsive (e.g., to accommodate loss of a communication and/or response), while reducing the number of allowed transmissions/retransmissions of the communication/message at block 8011 may reduce latency/delay in the system. FIGS. 8 and 9 thus illustrate options for operations of blocks 1009' and 1023' of FIG. 4.

Operations of FIG. 4, for example, may be performed by processor 223 (e.g., using non-substantive ping messages) before a substantive communication (e.g., a broadcast SMS, an IHHO request, a BCP request, etc.) is sent from the network element to confirm that the primary MSC of the pool is in service before each such substantive communication and/or to designate another MSC of the pool in the event that the primary MSC is not in service. According to other embodiments, operations of FIG. 4 may be performed by processor 223 periodically (e.g., using non-substantive ping messages) to maintain an updated hierarchy/order of MSCs of the pool whether substantive communications are sent or not. Operations of FIG. 4, for example, may be performed after the passage of an elapsed time regardless of other communications between the network element and the primary MSC, or operations of FIG. 4 may be performed periodically only if other communications between the network element and the primary MSC have not occurred for some predetermined period of time. When used to maintain/update the hierarchy/order of MSCs of the pool maintained in memory, processor 223 may reorder the hierarchy/order so that MSCs identified as primary/secondary/etc. may change, and primary MSC of block 1009' may thus change for a subsequent use of operations of FIG. 4.

According to still other embodiments, operations of FIG. 4 may be performed by processor 223 using a substantive communication (e.g., SMS broadcast, IHHO request, BCP request, etc.), such that non-substantive ping messages are not required, thereby potentially reducing communications traffic. For example, processor 223 may transmit a substantive communication (e.g., an SMS broadcast, an IHHO request, a BCP request, etc.) to the primary/first MSC at block 1005', and if a response is not received at block 1015, processor 223 may retransmit the substantive communication at block 1015 to secondary/tertiary/etc. MSCs until a response is received at block 1023'. Accordingly, the primary MSC may be confirmed at block 1027 (so that the existing hierarchy/order of MSCs of the pool is maintained in memory 225) or the hierarchy may be reordered at block 1035' as discussed above (so that the responding MSC is designated as the primary MSC). Because the substantive communication was transmitted initially, the separate transmitting operation of block 1039 may be omitted. For example, processor 223 may maintain a same hierarchy/order of MSCs of the pool (even if the primary MSC has been determined as being unreachable) so that each substantive communication is first transmitted to the same primary/first MSC even if the primary/first MSC was non-reachable for a previous communication.

According to other embodiments of the present invention shown in FIG. 5, processor 223 may be configured to perform operations 1001, 1005, 1009, 1015, 1019, 1023, 1027, 1031, 1035, and 1039 in a manner similar to that discussed above with respect to FIGS. 4, 8, and 9. In FIG. 5, however, processor 223 may be configured to delay ping messages until a test period has passed since a last communication with the designated/primary MSC. Accordingly, processor 223 can avoid transmitting unnecessary ping messages as long as communications between the network element and the designated/primary MSC are ongoing.

As shown in the flow chart of FIG. 5, a processor 223 may be configured to identify a hierarchy of MSCs 105-1 to 105-n in the pool at block 1001, and the hierarchy of MSCs may be saved in memory 225. At block 1005, processor 223 may transmit a ping message through network interface 221 to the primary (or first) MSC of the MSCs 105-1 to 105-n in the pool.

At block 1009, processor 223 may determine whether a response to the ping message is received from the primary MSC through network interface 221. If a ping response message is received at block 1009, processor 223 may designate the primary MSC for a subsequent communication at block 1027. Accordingly, the existing hierarchy/order of MSCs of the pool is maintained in memory 225. Processor 223 may then transmit a subsequent communication (e.g., an SMS broadcast, an IHHO request, a BCP request) to the designated primary MSC at block 1039.

If a ping response message is not received at block 1009 (e.g., if the primary MSC is non-reachable or out of service), processor 223 may determine if there is a next (e.g., a secondary or second) MSC in the hierarchy of MSCs 105-1 to 105-n in the pool at block 1015. If there is a next (e.g., secondary or second) MSC in the hierarchy at block 1015, processor 223 may transmit a ping message through network interface 221 to the secondary MSC of MSCs 105-1 to 105-n at block 1019.

At block 1023, processor 223 may determine whether a response to the ping message is received from the MSC through network interface 221. If a ping response message is not received at block 1023, operations of blocks 1015, 1019, and 1023 may be repeated until either a ping response message is received from an MSC in the hierarchy at block 1023 or ping messages are sent to all MSCs identified in the hierarchy without response from any of the MSCs at block 1015. If no responses are received from any of the MSCs of the hierarchy at block 1015, processor 223 may generate an error message at block 1031.

If a ping response message is received at block 1023 from an MSC in the hierarchy (other than the primary/first MSC), processor 223 may designate the MSC from which the response is received at block 1035 for a subsequent communication, and processor 223 may transmit a communication through network interface 221 to the designated MSC at block 1039. At block 1035, processor 223 may designate the non-primary MSC from which the response was received as the new primary MSC by reordering the hierarchy of MSCs of the pool saved in memory 225. For example, the primary MSC and any non-primary MSCs that did not respond may be removed from the ordering of the hierarchy or moved to the end of the order, and the new hierarchy/order may be saved to memory 225.

At block 1039, processor 223a may proceed with communications (through network interface 221) with the designated MSC (i.e., the MSC of the pool from which the response was received at block 1009 or at block 1023) of the pool of MSCs 105-1 to 105-n. As long as communications between the network element and the designated MSC are ongoing at blocks 1039 and 1043, processor 223 may not need to transmit further ping messages. Stated in other words, the ongoing communications between the network element and the designated MSC of the pool may be sufficient evidence that the MSC is reachable, available, and/or in service. If a test period since a last communication between the network element and the designated MSC lapses without any intervening communications therebetween at block 1043, operations of blocks 1005, 1009, 1015, 1019, 1023, 1027, 1031, and/or 1035 may be performed to confirm that the designated MSC of the pool is still available and/or in service or to provide a new hierarchy/order of MSCs of the pool.

According to other embodiments shown in FIG. 6, processor 223 may be configured to perform operations 1001, 1005, 1009, 1015, 1019, 1023, 1027, 1031, 1035, and 1039 in a manner similar to that discussed above with respect to FIGS. 4, 5, 8, and 9. In FIG. 6, however, processor 223 may be configured to delay ping messages until a substantive communication (e.g., a broadcast SMS, a BCP request, an IHHO request, etc.) is provided at processor 223 for transmission to an MSC of the pool of MSCs (including MSCs 105-1 to 105-n). Accordingly, processor 223 can avoid transmitting unnecessary ping messages during periods of time over which the network element is not transmitting communications to an MSC of the pool. Processor 223 may thus use ping messages to confirm availability of the currently designated primary MSC of the pool and/or to designate a new primary MSC of the pool before transmitting a communication such as a broadcast SMS, a BCP request, an IHHO request, etc.

As shown in the flow chart of FIG. 6, a processor 223 may be configured to identify a hierarchy of MSCs 105-1 to 105-n in the pool at block 1001, and the hierarchy of MSCs may be saved in memory 225. At block 1003, processor 223 may wait until a substantive communication (e.g., a broadcast SMS, a BCP request, an WHO request, etc.) is provided for transmission to an MSC of the pool including MSCs 105-1 to 105-n. Accordingly, no ping messages are required during periods of time when no communications are transmitted from the network element to the pool of MSCs, thereby potentially reducing network traffic.

Upon providing a communication to be transmitted to the pool of MSCs at block 1003, processor 223 may transmit a ping message through network interface 221 to the primary (or first) MSC of the MSCs 105-1 to 105-n in the pool at block 1005. At block 1009, processor 223 may determine whether a response to the ping message is received from the primary MSC through network interface 221. If a ping response message is received at block 1009, processor 223 may designate the primary MSC at block 1027 for the communication provided at block 1003. Accordingly, the existing hierarchy/order of MSCs of the pool is maintained in memory 225. Processor 223 may then transmit the communication to the designated primary MSC at block 1039.

If a ping response message is not received at block 1009 (e.g., if the primary MSC is non-reachable or out of service), processor 223 may determine if there is a next (e.g., a secondary or second) MSC in the hierarchy of MSCs 105-1 to 105-n in the pool at block 1015. If there is a next (e.g., secondary or second) MSC in the hierarchy at block 1015, processor 223 may transmit a ping message through network interface 221 to the secondary MSC of MSCs 105-1 to 105-n at block 1019.

At block 1023, processor 223 may determine whether a response to the ping message is received from the primary MSC through network interface 221. If a ping response message is not received at block 1023, operations of blocks 1015, 1019, and 1023 may be repeated until either a ping response message is received from an MSC in the hierarchy at block 1023 or ping messages are sent to all MSCs identified in the hierarchy at blocks 1015 and 1019 without response from any of the MSCs at block 1023. If no responses are received from any of the MSCs of the hierarchy and there are no remaining MSCs of the hierarchy at block 1015, processor 223 may generate an error message at block 1031.

If a ping response message is received at block 1023 from an MSC in the hierarchy (other than the primary/first MSC), processor 223 may designate the MSC from which the response is received at block 1035 for a subsequent communication, and processor 223 may transmit the substantive communication (provided at block 1003) through network interface 221 to the designated MSC at block 1039. At block 1035, processor 223 may designate the non-primary MSC from which the response was received as the new primary MSC by reordering the hierarchy of MSCs of the pool saved in memory 225. For example, the primary MSC and any non-primary MSCs that did not respond may be removed from the ordering of the hierarchy or moved to the end of the order, and the new hierarchy/order may be saved to memory 225.

Processor 223 may thus transmit the substantive communication (provided at block 1003) through network interface 221 to the designated MSC, and processor 223 may then wait at block 1003 for a next communication (e.g., a next broadcast SMS, a next BCP request, a next IHHO request, etc.) before proceeding with a next ping message at block 1005. As long as there are no communications between the network element and the pool of MSCs at block 1003, processor 223 may not need to transmit further ping messages thereby potentially reducing network traffic.

Figure 7A:
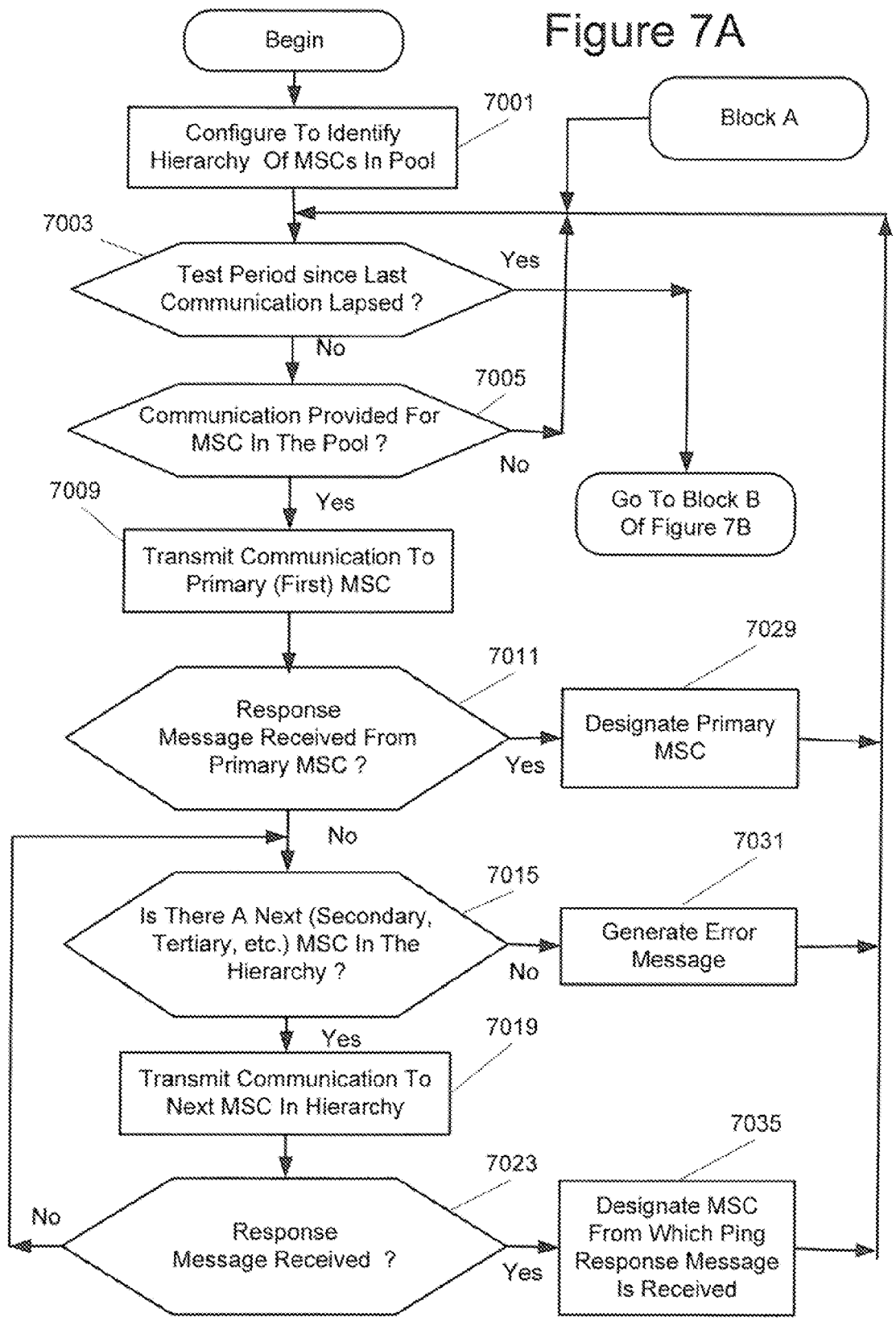

According to other embodiments shown in FIGS. 7A and 7B, processor 223 may be configured to combine aspects of operations discussed above with respect to FIGS. 4, 5, 6, 8, and 9. Processor 223, for example, may use substantive communications to confirm availability of a primary MSC of the pool and/or to designate a new primary MSC of the pool as long as communications are ongoing, and during periods when there are no substantive communications, processor 223 may be configured to use non-substantive ping messages to maintain a hierarchy/order of available MSCs of the pool. Accordingly, a hierarchy/order of available MSCs of the pool may be maintained during periods of ongoing communications and during periods without communications without significantly increasing network traffic.

As shown in the flow chart of FIGS. 7A and 7B, processor 223 may be configured to identify a hierarchy of MSCs 105-1 to 105-n in the pool at block 7001, and the hierarchy of MSCs may be saved in memory 225. At block 7003, processor 223 may determine if a test period since a last communication with the pool of MSCs has occurred, and at block 7005, processor 223 may determine if a substantive communication (e.g., a broadcast SMS, a BCP request, an IHHO request, etc.) has been provided. Moreover, processor 223 may wait in a loop through blocks 7003 and 7005 until either the test period lapses without communications between the network element and the pool of MSCs at block 7003 or until a communication is provided at processor 223 for the pool of MSCs at block 7005. If the test period lapses without communications between the network element and the pool of MSCs at block 7003, processor 223 may proceed to block B of FIG. 7B.

If a substantive communication is provided at processor 223 at block 7005, processor 223 may transmit the substantive communication (e.g., a broadcast SMS, a BCP request, an IHHO request, etc.) through network interface 221 to the primary (or first) MSC of the MSCs 105-1 to 105-n in the pool at block 7009. At block 7011, processor 223 may determine whether a response to the substantive communication is received from the primary MSC through network interlace 221. If a response message is received at block 7011, processor 223 may designate the primary MSC at block 7029 for subsequent communications. Accordingly, the existing hierarchy/order of MSCs of the pool is maintained in memory 225. Processor 223 may then return to blocks 7003 and 7005 to await a next communication for the pool of MSCs.

If a response message is not received at block 7011 (e.g., if the primary MSC is non-reachable or out of service), processor 223 may determine if there is a next (e.g., a secondary or second) MSC in the hierarchy of MSCs 105-1 to 105-n in the pool at block 7015. If there is a next (e.g., secondary or second) MSC in the hierarchy at block 7015, processor 223 may transmit the communication (provided at block 7005) through network interface 221 to the secondary MSC of MSCs 105-1 to 105-n at block 7019.

At block 7023, processor 223 may determine whether a response to the communication is received through network interface 221. If a response message is not received at block 7023, operations of blocks 7015, 7019, and 7023 may be repeated until either a response message is received from an MSC in the hierarchy at block 7023 or the communication is sent to all MSCs identified in the hierarchy at blocks 7015 and 7019 without response from any of the MSCs at block 7023. If no responses are received from any of the MSCs of the hierarchy and there are no remaining MSCs of the hierarchy at block 7015, processor 223 may generate an error message at block 7031.

If a response message is received at block 7023 from an MSC in the hierarchy (other than the primary/first MSC), processor 223 may designate the MSC from which the response is received as a new primary MSC of the pool at block 7035 for a subsequent communications. At block 7035, processor 223 may designate the non-primary MSC from which the response was received as the new primary MSC by reordering the hierarchy of MSCs of the pool saved in memory 225. For example, the primary MSC and any non-primary MSCs that did not respond may be removed from the ordering of the hierarchy or moved to the end of the order, and the new hierarchy/order may be saved to memory 225.

As long as there are ongoing communications between the network element and the pool of MSCs, the substantive communications themselves may be used to confirm availability of MSCs of the pool and/or to update the hierarchy/order of the MSCs of the pool as discussed above with respect to FIG. 7A. If the test period lapses without communication between the network element and the pool of MSCs at block 7003, however, processor 223 may proceed to block B of FIG. 7B, and processor 223 may maintain/update the order/hierarchy of MSCs of the pool according to operations of FIG. 7B.

More particularly, a processor 223 may transmit a ping message through network interface 221 to the primary (or first) MSC of the MSCs 105-1 to 105-n in the pool at block 1005. At block 1009, processor 223 may determine whether a response to the ping message is received from the primary MSC through network interface 221. If a ping response message is received at block 1009, processor 223 may designate the primary MSC at block 1027 for subsequent communications. Accordingly, the existing hierarchy/order of MSCs of the pool is maintained in memory 225 for a next communication and/or ping message. Processor 223 may then return to block A and the loop of blocks 7003 and 7005 as discussed above.

If a ping response message is not received at block 1009 (e.g., if the primary MSC is non-reachable or out of service), processor 223 may determine if there is a next (e.g., a secondary or second) MSC in the hierarchy of MSCs 105-1 to 105-n in the pool at block 1015. If there is a next (e.g., secondary or second) MSC in the hierarchy at block 1015, processor 223 may transmit a ping message through network interface 221 to the secondary MSC of MSCs 105-1 to 105-n at block 1019.

At block 1023, processor 223 may determine whether a response to the ping message is received from the MSC through network interface 221. If a ping response message is not received at block 1023, operations of blocks 1015, 1019, and 1023 may be repeated until either a ping response message is received from an MSC in the hierarchy at block 1023 or ping messages are sent to all MSCs identified in the hierarchy at blocks 1015 and 1019 without response from any of the MSCs at block 1023. If no responses are received from any of the MSCs of the hierarchy and there are no remaining MSCs of the hierarchy at block 1015, processor 223 may generate an error message at block 1031, and return to the loop of blocks 7003 and 7005 of FIG. 7A (via block A).

If a ping response message is received at block 1023 from an MSC in the hierarchy (other than the primary/first MSC), processor 223 may designate the MSC from which the response is received at block 1035 subsequent communications, and processor 223 may return to the loop of blocks 7001 and 7003 of FIG. 7A (vial block A). At block 1035, processor 223 may designate the non-primary MSC from which the response was received as the new primary MSC by reordering the hierarchy of MSCs of the pool saved in memory 225. For example, the primary MSC and any non-primary MSCs that did not respond may be removed from the ordering of the hierarchy or moved to the end of the order, and the new hierarchy/order may be saved to memory 225.

According to some embodiments discussed herein, a hierarchy of MSCs within a pool may be queried (e.g., using ping messages) according to an order of the hierarchy so that subsequent MSCs in the hierarchy are only queried after unsuccessfully querying all preceding MSCs of the hierarchy. As soon as an available MSC of the hierarchy is identified, the network element can proceed with the communication and/or reorder the hierarchy according to the available information (e.g., based on any unavailable MSCs that are identified before identifying a first available MSC in the hierarchy).

According to some other embodiments, all MSCs of the hierarchy may be queried (even if one or more preceding MSCs in the hierarchy are available) to determine current availability/unavailability of all MSCs of the hierarchy, and the hierarchy may be reordered according to the results. For example, all MSCs of a hierarchy may be periodically queried (e.g., using ping messages) to update/reorder the hierarchy based on any unavailable MSC (even when there are no substantive communications for any MSCs of the pool). Accordingly, delays in sending substantive communications may be reduced because the periodically updated/reordered hierarchy may more accurately reflect a current status of MSC availability/unavailability of the hierarchy within the pool (particularly if substantive communications to the pool are relatively infrequent). According to still other embodiments, all MSCs of a hierarchy may be queried (e.g., using ping messages) when a substantive communication has been provided for an MSC of the pool. The MSCs may be queried in the order of the hierarchy, and the substantive communication may the transmitted to the first MSC of the hierarchy that is available. In addition, the remaining MSCs of the hierarchy may be queried, and the order of the hierarchy may be updated based on availability/unavailability of all of the MSCs of the hierarchy.

According to still other embodiments, the network element may distribute its outgoing traffic of substantive communications for the pool of MSCs between a plurality of MSCs of the pool (possibly including all MSCs of the pool). Responses (ACKs and/or NACKs) and/or non-responses to these communications from the recipient MSCs may be used to maintain an accurate list of available MSCs of the pool, and/or to maintain a hierarchy to be used when a communication is sent to an unavailable MSC of the pool. If a communication transmitted from the network element to an MSC of the pool fails, the list/hierarchy may be used to identify another MSC of the pool to retransmit the communication to.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method for a network element providing communications with a wireless communications network, wherein the wireless communications network includes a plurality of pooled mobile switching centers coupled to a base station controller so that each of the plurality of pooled mobile switching centers is configured to control communications with respective wireless terminals communicating through the base station controller, the method comprising:

transmitting a ping message from the network element to a primary pooled mobile switching center of the plurality of pooled mobile switching centers;

responsive to receipt of a ping response message at the network element from the primary pooled mobile switching center, transmitting a communication from the network element to the primary pooled mobile switching center;

responsive to non-receipt of a ping response message at the network element from the primary pooled mobile switching center, transmitting the communication from the network element to a secondary pooled mobile switching center of the plurality of pooled mobile switching centers; and wherein the network element is a short message service center and the communication is a short message service broadcast, wherein transmitting the communication to the primary pooled mobile switching center comprises transmitting the short message service broadcast to the primary pooled mobile switching center for transmission through the base station controller to the respective wireless terminals communicating through the base station controller, and wherein transmitting the communication to the secondary pooled mobile switching center comprises transmitting the short message service broadcast to the secondary pooled mobile switching center for transmission through the base station controller to the respective wireless terminals communicating through the base station controller.

2. A method for a network element providing communications with a wireless communications network, wherein the wireless communications network includes a plurality of pooled mobile switching centers coupled to a base station controller so that each of the plurality of pooled mobile switching centers is configured to control communications with respective wireless terminals communicating through the base station controller, the method comprising:

transmitting a ping message from the network element to a primary pooled mobile switching center of the plurality of pooled mobile switching centers;

responsive to receipt of a ping response message at the network element from the primary pooled mobile switching center, transmitting a communication from the network element to the primary pooled mobile switching center;

responsive to non-receipt of a ping response message at the network element from the primary pooled mobile switching center, transmitting the communication from the network element to a secondary pooled mobile switching center of the plurality of pooled mobile switching centers; and wherein the network element is an originating mobile switching center and the communication is a border cell page, wherein transmitting the communication to the primary pooled mobile switching center comprises transmitting the border cell page to the primary pooled mobile switching center for transmission through the base station controller over a geographic area adjacent a geographic area served by the originating mobile switching center, and wherein transmitting the communication to the secondary pooled mobile switching center comprises transmitting the border cell page to the secondary pooled mobile switching center for transmission through the base station controller over a geographic area adjacent a geographic area served by the originating mobile switching center.

3. A method for a network element providing communications with a wireless communications network, wherein the wireless communications network includes a plurality of pooled mobile switching centers coupled to a base station controller so that each of the plurality of pooled mobile switching centers is configured to control communications with respective wireless terminals communicating through the base station controller, the method comprising:

transmitting a ping message from the network element to a primary pooled mobile switching center of the plurality of pooled mobile switching centers;

responsive to receipt of a ping response message at the network element from the primary pooled mobile switching center, transmitting a communication from the network element to the primary pooled mobile switching center;

responsive to non-receipt of a ping response message at the network element from the primary pooled mobile switching center, transmitting the communication from the network element to a secondary pooled mobile switching center of the plurality of pooled mobile switching centers; and wherein the network element is an originating mobile switching center and the communication is a intersystem hard handoff communication for a wireless terminal engaged in a radiotelephone call, wherein transmitting the communication to the primary pooled mobile switching center comprises transmitting the intersystem hard handoff communication to the primary pooled mobile switching center to initiate handoff of the wireless terminal between the originating mobile switching center and the primary pooled mobile switching center while maintaining the radiotelephone call, and wherein transmitting the communication to the secondary pooled mobile switching center comprises transmitting the intersystem hard handoff communication to the secondary pooled mobile switching center to initiate handoff of the wireless terminal between the originating mobile switching center and the secondary pooled mobile switching center while maintaining the radiotelephone call.

4. A method for a network element providing communications with a wireless communications network, wherein the wireless communications network includes a plurality of pooled mobile switching centers coupled to a base station controller so that each of the plurality of pooled mobile switching centers is configured to control communications with respective wireless terminals communicating through the base station controller, the method comprising:

transmitting a ping message from the network element to a primary pooled mobile switching center of the plurality of pooled mobile switching centers;

responsive to receipt of a ping response message at the network element from the primary pooled mobile switching center, transmitting a communication from the network element to the primary pooled mobile switching center;

responsive to non-receipt of a ping response message at the network element from the primary pooled mobile switching center, transmitting the communication from the network element to a secondary pooled mobile switching center of the plurality of pooled mobile switching centers;

wherein before transmitting the ping message, providing the communication at the network element; and wherein transmitting the ping message comprises transmitting the ping message from the network element to the primary pooled mobile switching center responsive to providing the communication at the network element.

5. A method for a network element providing communications with a wireless communications network, wherein the wireless communications network includes a plurality of pooled mobile switching centers coupled to a base station controller so that each of the plurality of pooled mobile switching centers is configured to control communications with respective wireless terminals communicating through the base station controller, the method comprising:

transmitting a message from the network element to a primary pooled mobile switching center of the plurality of pooled mobile switching centers;

responsive to receipt of a response message at the network element from the primary pooled mobile switching center, designating the primary pooled mobile switching center for transmissions from the network element to the plurality of pooled mobile switching centers; and after transmitting the message to the primary pooled mobile switching center and responsive to non-receipt of a response message at the network element from the primary pooled mobile switching center, designating a secondary pooled mobile switching center for transmissions from the network element to the plurality of pooled mobile switching centers;

wherein the message comprises a ping message, and wherein the response message comprises a ping response message, the method further comprising;

transmitting a communication from the network element to the designated one of the primary and secondary pooled mobile switching centers responsive to designating the primary pooled mobile switching center or designating the secondary pooled mobile switching center;

wherein transmitting the communication comprises transmitting a first communication, and wherein the designated one of the primary and secondary pooled mobile switching centers is a first designated one of the primary and secondary pooled mobile switching centers, the method further comprising:

after transmitting the communication to the first designated one of the primary and secondary pooled mobile switching centers, maintaining the first designated one of the primary and secondary pooled mobile switching centers for transmissions from the network element for at least a test period;

after a passing of the test period subsequent to transmitting the first communication without any subsequent communication between the network element and the first designated one of the primary and secondary pooled mobile switching centers, transmitting a second ping message from the network element to the primary pooled mobile switching center;

responsive to receipt of a ping response message at the network element from the primary pooled mobile switching center in response to the second ping message, designating the primary pooled mobile switching center as a second designated one of the primary and secondary pooled mobile switching centers for transmissions from the network element to the plurality of pooled mobile switching centers;

after transmitting the second ping message to the primary pooled mobile switching center and responsive to non-receipt of a ping response message at the network element from the primary pooled mobile switching center in response to the second ping message, designating the secondary pooled mobile switching center as a second designated one of the primary and secondary pooled mobile switching centers for transmissions from the network element to the plurality of pooled mobile switching centers; and transmitting a second communication from the network element to the second designated one of the primary and secondary pooled mobile switching centers responsive to designating the primary pooled mobile switching center or designating the secondary pooled mobile switching center after transmitting the second ping message.

6. The method of claim 5 wherein the message comprises a communication addressed to one or more of the wireless terminals, the method further comprising:

before designating the secondary pooled mobile switching center and responsive to non-receipt of the response message from the primary pooled mobile switching center, transmitting the message to the secondary pooled mobile switching center, wherein designating the secondary pooled mobile switching center comprises designating the secondary pooled mobile switching center responsive to receipt of a response message at the network element from the secondary mobile switching center.

7. A method for a network element providing communications with a wireless communications network, wherein the wireless communications network includes a plurality of pooled mobile switching centers coupled to a base station controller so that each of the plurality of pooled mobile switching centers is configured to control communications with respective wireless terminals communicating through the base station controller, the method comprising:

transmitting a message from the network element to a primary pooled mobile switching center of the plurality of pooled mobile switching centers;

responsive to receipt of a response message at the network element from the primary pooled mobile switching center, designating the primary pooled mobile switching center for transmissions from the network element to the plurality of pooled mobile switching centers;

after transmitting the message to the primary pooled mobile switching center and responsive to non-receipt of a response message at the network element from the primary pooled mobile switching center, designating a secondary pooled mobile switching center for transmissions from the network element to the plurality of pooled mobile switching centers;

wherein the message comprises a ping message, and wherein the response message comprises a ping response message, the method further comprising;

transmitting a communication from the network element to the designated one of the primary and secondary pooled mobile switching centers responsive to designating the primary pooled mobile switching center or designating the secondary pooled mobile switching center; and wherein the network element is a short message service center and the communication is a short message service broadcast, wherein transmitting the communication to the primary pooled mobile switching center comprises transmitting the short message service broadcast to the primary pooled mobile switching center for transmission through the base station controller to the respective wireless terminals communicating through the base station controller, and wherein transmitting the communication to the secondary pooled mobile switching center comprises transmitting the short message service broadcast to the secondary pooled mobile switching center for transmission through the base station controller to the respective wireless terminals communicating through the base station controller.

8. A method for a network element providing communications with a wireless communications network, wherein the wireless communications network includes a plurality of pooled mobile switching centers coupled to a base station controller so that each of the plurality of pooled mobile switching centers is configured to control communications with respective wireless terminals communicating through the base station controller, the method comprising:

transmitting a message from the network element to a primary pooled mobile switching center of the plurality of pooled mobile switching centers;

responsive to receipt of a response message at the network element from the primary pooled mobile switching center, designating the primary pooled mobile switching center for transmissions from the network element to the plurality of pooled mobile switching centers;

after transmitting the message to the primary pooled mobile switching center and responsive to non-receipt of a response message at the network element from the primary pooled mobile switching center, designating a secondary pooled mobile switching center for transmissions from the network element to the plurality of pooled mobile switching centers;

wherein the message comprises a ping message, and wherein the response message comprises a ping response message, the method further comprising;

transmitting a communication from the network element to the designated one of the primary and secondary pooled mobile switching centers responsive to designating the primary pooled mobile switching center or designating the secondary pooled mobile switching center; and wherein the network element is an originating mobile switching center and the communication is a border cell page, wherein transmitting the communication to the primary pooled mobile switching center comprises transmitting the border cell page to the primary pooled mobile switching center for transmission through the base station controller over a geographic area adjacent a geographic area served by the originating mobile switching center, and wherein transmitting the communication to the secondary pooled mobile switching center comprises transmitting the border cell page to the secondary pooled mobile switching center for transmission through the base station controller over a geographic area adjacent a geographic area served by the originating mobile switching center.

9. A method for a network element providing communications with a wireless communications network, wherein the wireless communications network includes a plurality of pooled mobile switching centers coupled to a base station controller so that each of the plurality of pooled mobile switching centers is configured to control communications with respective wireless terminals communicating through the base station controller, the method comprising:

transmitting a message from the network element to a primary pooled mobile switching center of the plurality of pooled mobile switching centers;

responsive to receipt of a response message at the network element from the primary pooled mobile switching center, designating the primary pooled mobile switching center for transmissions from the network element to the plurality of pooled mobile switching centers;

after transmitting the message to the primary pooled mobile switching center and responsive to non-receipt of a response message at the network element from the primary pooled mobile switching center, designating a secondary pooled mobile switching center for transmissions from the network element to the plurality of pooled mobile switching centers;

wherein the message comprises a ping message, and wherein the response message comprises a ping response message, the method further comprising;

transmitting a communication from the network element to the designated one of the primary and secondary pooled mobile switching centers responsive to designating the primary pooled mobile switching center or designating the secondary pooled mobile switching center; and wherein the network element is an originating mobile switching center and the communication is a intersystem hard handoff communication for a wireless terminal engaged in a radiotelephone call, wherein transmitting the communication to the primary pooled mobile switching center comprises transmitting the intersystem hard handoff communication to the primary pooled mobile switching center to initiate handoff of the wireless terminal between the originating mobile switching center and the primary pooled mobile switching center while maintaining the radiotelephone call, and wherein transmitting the communication to the secondary pooled mobile switching center comprises transmitting the intersystem hard handoff communication to the secondary pooled mobile switching center to initiate handoff of the wireless terminal between the originating mobile switching center and the secondary pooled mobile switching center while maintaining the radiotelephone call. response message at the network element from the secondary mobile switching center.

10. A network element providing communications with a wireless communications network, wherein the wireless communication network includes a plurality of pooled mobile switching centers coupled to a base station controller so that each of the plurality of pooled mobile switching centers is configured to control communications with respective wireless terminals communicating through the base station controller, the network element comprising:

a interface configured to transmit communications to and receive communications from the plurality of pooled mobile switching centers; and a processor coupled to the interface wherein the processor is configured to generate a ping message for transmission from the interface to a primary pooled mobile switching center of the plurality of pooled mobile switching centers, to provide a communication for transmission from the interface to the primary pooled mobile switching center responsive to receipt of a ping response message at the interface from the primary pooled mobile switching center, and to provide the communication for transmission from the interface to a secondary pooled mobile switching center of the plurality of pooled mobile switching centers responsive to non-receipt of a ping response message at the interface from the primary pooled mobile switching center; and wherein the network element is a short message service center and the communication is a short message service broadcast, wherein transmitting the communication to the primary pooled mobile switching center comprises transmitting the short message service broadcast to the primary pooled mobile switching center for transmission through the base station controller to the respective wireless terminals communicating through the base station controller, and wherein transmitting the communication to the secondary pooled mobile switching center comprises transmitting the short message service broadcast to the secondary pooled mobile switching center for transmission through the base station controller to the respective wireless terminals communicating through the base station controller.

11. A network element providing communications with a wireless communications network, wherein the wireless communication network includes a plurality of pooled mobile switching centers coupled to a base station controller so that each of the plurality of pooled mobile switching centers is configured to control communications with respective wireless terminals communicating through the base station controller, the network element comprising:

a interface configured to transmit communications to and receive communications from the plurality of pooled mobile switching centers;

a processor coupled to the interface wherein the processor is configured to generate a ping message for transmission from the interface to a primary pooled mobile switching center of the plurality of pooled mobile switching centers, to provide a communication for transmission from the interface to the primary pooled mobile switching center responsive to receipt of a ping response message at the interface from the primary pooled mobile switching center, and to provide the communication for transmission from the interface to a secondary pooled mobile switching center of the plurality of pooled mobile switching centers responsive to non-receipt of a ping response message at the interface from the primary pooled mobile switching center; and wherein the network element is an originating mobile switching center and the communication is a border cell page, wherein transmitting the communication to the primary pooled mobile switching center comprises transmitting the border cell page to the primary pooled mobile switching center for transmission through the base station controller over a geographic area adjacent a geographic area served by the originating mobile switching center, and wherein transmitting the communication to the secondary pooled mobile switching center comprises transmitting the border cell page to the secondary pooled mobile switching center for transmission through the base station controller over a geographic area adjacent a geographic area served by the originating mobile switching center.

12. A network element providing communications through a wireless communications network, wherein the wireless communication network includes a plurality of pooled mobile switching centers coupled to a base station controller so that each of the plurality of pooled mobile switching centers is configured to control communications with respective wireless terminals communicating through the base station controller, the network element comprising:

a interface configured to transmit communications to and receive communications from the plurality of pooled mobile switching centers;

a processor coupled to the interface wherein the processor is configured to generate a message for transmission from the interface to a primary pooled mobile switching center of the plurality of pooled mobile switching centers, to designate the primary pooled mobile switching center for transmissions from the network element to the plurality of pooled mobile switching centers responsive to receipt of a response message through the interface from the primary pooled mobile switching center, to designate a secondary pooled mobile switching center for transmissions from the interface to the plurality of pooled mobile switching centers after transmitting the message to the primary pooled mobile switching center and responsive to non-receipt of a response message at the network element from the primary pooled mobile switching center;

wherein the message comprises a ping message, wherein the response message comprises a ping response message, and wherein the processor is further configured to provide a communication for transmission from the interface to the designated one of the primary and secondary pooled mobile switching centers responsive to designating the primary pooled mobile switching center or designating the secondary pooled mobile switching center;

wherein transmitting the communication comprises the processor further being configured to transmit a first communication, and wherein the designated one of the primary and secondary pooled mobile switching centers is a first designated one of the primary and secondary pooled mobile switching centers, the processor further configured to:

after transmitting the communication to the first designated one of the primary and secondary pooled mobile switching centers, maintain the first designated one of the primary and secondary pooled mobile switching centers for transmissions from the network element for at least a test period;

after a passing of the test period subsequent to transmitting the first communication without any subsequent communication between the network element and the first designated one of the primary and secondary pooled mobile switching centers, transmit a second ping message from the network element to the primary pooled mobile switching center;

responsive to receipt of a ping response message at the network element from the primary pooled mobile switching center in response to the second ping message, designate the primary pooled mobile switching center as a second designated one of the primary and secondary pooled mobile switching centers for transmissions from the network element to the plurality of pooled mobile switching centers;

after transmitting the second ping message to the primary pooled mobile switching center and responsive to non-receipt of a ping response message at the network element from the primary pooled mobile switching center in response to the second ping message, designate the secondary pooled mobile switching center as a second designated one of the primary and secondary pooled mobile switching centers for transmissions from the network element to the plurality of pooled mobile switching centers; and transmit a second communication from the network element to the second designated one of the primary and secondary pooled mobile switching centers responsive to designating the primary pooled mobile switching center or designating the secondary pooled mobile switching center after transmitting the second ping message.

13. A network element providing communications through a wireless communications network, wherein the wireless communication network includes a plurality of pooled mobile switching centers coupled to a base station controller so that each of the plurality of pooled mobile switching centers is configured to control communications with respective wireless terminals communicating through the base station controller, the network element comprising:

a interface configured to transmit communications to and receive communications from the plurality of pooled mobile switching centers;

a processor coupled to the interface wherein the processor is configured to generate a message for transmission from the interface to a primary pooled mobile switching center of the plurality of pooled mobile switching centers, to designate the primary pooled mobile switching center for transmissions from the network element to the plurality of pooled mobile switching centers responsive to receipt of a response message through the interface from the primary pooled mobile switching center, to designate a secondary pooled mobile switching center for transmissions from the interface to the plurality of pooled mobile switching centers after transmitting the message to the primary pooled mobile switching center and responsive to non-receipt of a response message at the network element from the primary pooled mobile switching center;

wherein the message comprises a ping message, wherein the response message comprises a ping response message, and wherein the processor is further configured to provide a communication for transmission from the interface to the designated one of the primary and secondary pooled mobile switching centers responsive to designating the primary pooled mobile switching center or designating the secondary pooled mobile switching center; and wherein the network element is a short message service center and the communication is a short message service broadcast, wherein transmitting the communication to the primary pooled mobile switching center comprises transmitting the short message service broadcast to the primary pooled mobile switching center for transmission through the base station controller to the respective wireless terminals communicating through the base station controller, and wherein transmitting the communication to the secondary pooled mobile switching center comprises transmitting the short message service broadcast to the secondary pooled mobile switching center for transmission through the base station controller to the respective wireless terminals communicating through the base station controller.

14. A network element providing communications through a wireless communications network, wherein the wireless communication network includes a plurality of pooled mobile switching centers coupled to a base station controller so that each of the plurality of pooled mobile switching centers is configured to control communications with respective wireless terminals communicating through the base station controller, the network element comprising:

a interface configured to transmit communications to and receive communications from the plurality of pooled mobile switching centers;

a processor coupled to the interface wherein the processor is configured to generate a message for transmission from the interface to a primary pooled mobile switching center of the plurality of pooled mobile switching centers, to designate the primary pooled mobile switching center for transmissions from the network element to the plurality of pooled mobile switching centers responsive to receipt of a response message through the interface from the primary pooled mobile switching center, to designate a secondary pooled mobile switching center for transmissions from the interface to the plurality of pooled mobile switching centers after transmitting the message to the primary pooled mobile switching center and responsive to non-receipt of a response message at the network element from the primary pooled mobile switching center;

wherein the message comprises a ping message, wherein the response message comprises a ping response message, and wherein the processor is further configured to provide a communication for transmission from the interface to the designated one of the primary and secondary pooled mobile switching centers responsive to designating the primary pooled mobile switching center or designating the secondary pooled mobile switching center; and wherein the network element is an originating mobile switching center and the communication is a border cell page, wherein transmitting the communication to the primary pooled mobile switching center comprises transmitting the border cell page to the primary pooled mobile switching center for transmission through the base station controller over a geographic area adjacent a geographic area served by the originating mobile switching center, and wherein transmitting the communication to the secondary pooled mobile switching center comprises transmitting the border cell page to the secondary pooled mobile switching center for transmission through the base station controller over a geographic area adjacent a geographic area served by the originating mobile switching center.

15. A network element providing communications through a wireless communications network, wherein the wireless communication network includes a plurality of pooled mobile switching centers coupled to a base station controller so that each of the plurality of pooled mobile switching centers is configured to control communications with respective wireless terminals communicating through the base station controller, the network element comprising:

a interface configured to transmit communications to and receive communications from the plurality of pooled mobile switching centers;

a processor coupled to the interface wherein the processor is configured to generate a message for transmission from the interface to a primary pooled mobile switching center of the plurality of pooled mobile switching centers, to designate the primary pooled mobile switching center for transmissions from the network element to the plurality of pooled mobile switching centers responsive to receipt of a response message through the interface from the primary pooled mobile switching center, to designate a secondary pooled mobile switching center for transmissions from the interface to the plurality of pooled mobile switching centers after transmitting the message to the primary pooled mobile switching center and responsive to non-receipt of a response message at the network element from the primary pooled mobile switching center;

wherein the message comprises a ping message, wherein the response message comprises a ping response message, and wherein the processor is further configured to provide a communication for transmission from the interface to the designated one of the primary and secondary pooled mobile switching centers responsive to designating the primary pooled mobile switching center or designating the secondary pooled mobile switching center; and wherein the network element is an originating mobile switching center and the communication is a intersystem hard handoff communication for a wireless terminal engaged in a radiotelephone call, wherein transmitting the communication to the primary pooled mobile switching center comprises transmitting the intersystem hard handoff communication to the primary pooled mobile switching center to initiate handoff of the wireless terminal between the originating mobile switching center and the primary pooled mobile switching center while maintaining the radiotelephone call, and wherein transmitting the communication to the secondary pooled mobile switching center comprises transmitting the intersystem hard handoff communication to the secondary pooled mobile switching center to initiate handoff of the wireless terminal between the originating mobile switching center and the secondary pooled mobile switching center while maintaining the radiotelephone call.

* * * * *

UNITED STATES PATENT AND TRADEMARK OFFICE
CERTIFICATE OF CORRECTION

| | |
|---|---|
| PATENT NO. | : 8,504,041 B2 |
| APPLICATION NO. | : 13/155796 |
| DATED | : August 6, 2013 |
| INVENTOR(S) | : Stephens |

It is certified that error appears in the above-identified patent and that said Letters Patent is hereby corrected as shown below:

In the Specification

In Column 4, Line 13, delete "Access'Network" and insert -- Access Network --, therefor.

In Column 8, Line 43, delete "an BCP" and insert -- a BCP --, therefor.

In Column 9, Line 45, delete "NACK•may" and insert -- NACK may --, therefor.

In Column 12, Line 58, delete "WHO" and insert -- IHHO --, therefor.

In Column 14, Line 26, delete "interlace" and insert -- interface --, therefor.

In the Claims

In Column 21, Line 3, in Claim 5, delete "comprising;" and insert -- comprising: --, therefor.

In Column 22, Line 24, in Claim 7, delete "comprising;" and insert -- comprising: --, therefor.

In Column 23, Line 3, in Claim 8, delete "comprising;" and insert -- comprising: --, therefor.

In Column 23, Line 49, in Claim 9, delete "comprising;" and insert -- comprising: --, therefor.

In Column 24, Lines 6-7, in Claim 9, delete "call. response message at the network element from the secondary mobile switching center." and insert -- call. --, therefor.

Signed and Sealed this
Twentieth Day of May, 2014

Michelle K. Lee
*Deputy Director of the United States Patent and Trademark Office*